(12) United States Patent
Madsen

(10) Patent No.: US 11,309,575 B2
(45) Date of Patent: Apr. 19, 2022

(54) ENERGY STORAGE DEVICE

(71) Applicant: Dyson Technology Limited, Wiltshire (GB)

(72) Inventor: Alex Madsen, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 200 days.

(21) Appl. No.: 16/494,861

(22) PCT Filed: Mar. 16, 2018

(86) PCT No.: PCT/GB2018/050691
§ 371 (c)(1),
(2) Date: Sep. 17, 2019

(87) PCT Pub. No.: WO2018/167511
PCT Pub. Date: Sep. 20, 2018

(65) Prior Publication Data
US 2020/0099086 A1 Mar. 26, 2020

(30) Foreign Application Priority Data
Mar. 17, 2017 (GB) .................................. 1704295

(51) Int. Cl.
*H01M 50/10* (2021.01)
*H01M 10/02* (2006.01)
*H01M 10/04* (2006.01)

(52) U.S. Cl.
CPC ....... *H01M 10/02* (2013.01); *H01M 10/0413* (2013.01); *H01M 10/0468* (2013.01); *H01M 50/10* (2021.01)

(58) Field of Classification Search
CPC ...... H01M 50/10; H01M 50/15; H01M 10/02; H01M 10/04
See application file for complete search history.

(56) References Cited

U.S. PATENT DOCUMENTS 3,373,060 A    3/1968   Gray
3,395,043 A    7/1968   Shoeld
               (Continued)

FOREIGN PATENT DOCUMENTS

CN       1588688 A       3/2005
DE    102012018040 A1    3/2014
               (Continued)

OTHER PUBLICATIONS

Notice of Reasons for Rejection dated Aug. 17, 2020, directed to JP Application No. 2019-550854; 7 pages.
(Continued)

*Primary Examiner* — Kenneth J Douyette
(74) *Attorney, Agent, or Firm* — Faegre Drinker Biddle & Reath LLP

(57) ABSTRACT

An energy storage device comprising a container, a mandrel, at least one sheet of separator material, and two or more electrodes. The container comprises an inner surface. The mandrel comprises a mandrel surface, and is positioned within the container so that the mandrel surface is spaced apart from the inner surface to define a cavity within the container. The container has a packing axis that passes through the cavity, the mandrel surface, and the inner surface. The mandrel is compressible in the direction of the packing axis, the at least one sheet of separator material is arranged in the cavity to provide a plurality of separator layers along the packing axis, and an electrode is provided between the separator layers.

5 Claims, 4 Drawing Sheets

(56) References Cited

U.S. PATENT DOCUMENTS

| | | | |
|---|---|---|---|
| 3,897,266 | A | 7/1975 | Devitt et al. |
| 4,158,300 | A | 6/1979 | Hug et al. |
| 4,212,179 | A | 7/1980 | Juergens |
| 5,323,527 | A | 6/1994 | Ribordy et al. |
| 5,521,021 | A * | 5/1996 | Alexandres ....... H01M 10/0431 429/54 |
| 6,287,719 | B1 | 9/2001 | Bailey |
| 6,485,859 | B1 * | 11/2002 | Szyszkowski .......... H01M 4/78 429/66 |
| 7,811,697 | B2 | 10/2010 | Hyung et al. |
| 8,129,048 | B2 | 3/2012 | Hirakawa et al. |
| 9,136,557 | B2 | 9/2015 | Bouvier |
| 9,742,045 | B2 | 8/2017 | Chami et al. |
| 2002/0160257 | A1 | 10/2002 | Lee et al. |
| 2003/0077506 | A1 | 4/2003 | Michel et al. |
| 2003/0091893 | A1 | 5/2003 | Kishiyama et al. |
| 2003/0162086 | A1 | 8/2003 | Longhi, Jr. et al. |
| 2006/0121339 | A1 | 6/2006 | Woo et al. |
| 2006/0222943 | A1 | 10/2006 | Fujikawa et al. |
| 2009/0061304 | A1 | 3/2009 | Muraoka et al. |
| 2009/0077794 | A1 | 3/2009 | Hirakawa et al. |
| 2009/0123833 | A1 | 5/2009 | Mao et al. |
| 2011/0104572 | A1 | 5/2011 | Ahn et al. |
| 2011/0217586 | A1 | 9/2011 | Kim et al. |
| 2011/0229747 | A1 | 9/2011 | Mitani et al. |
| 2013/0004817 | A1 | 1/2013 | Lee et al. |
| 2013/0288115 | A1 * | 10/2013 | Nidelkoff .......... H01M 10/0587 429/208 |
| 2014/0011076 | A1 | 1/2014 | Kanemoto et al. |
| 2014/0038027 | A1 | 2/2014 | Kanemoto et al. |
| 2014/0045052 | A1 | 2/2014 | Kim |
| 2014/0082930 | A1 | 3/2014 | Bouvier |
| 2014/0099525 | A1 | 4/2014 | Kwon et al. |
| 2014/0349158 | A1 | 11/2014 | Kanemoto et al. |
| 2020/0020894 | A1 | 1/2020 | Madsen |
| 2020/0091545 | A1 | 3/2020 | Madsen |
| 2020/0091546 | A1 | 3/2020 | Madsen |

FOREIGN PATENT DOCUMENTS

| | | |
|---|---|---|
| EP | 0797849 | 11/2003 |
| EP | 1768202 A1 | 3/2007 |
| EP | 1348237 | 8/2011 |
| EP | 2693523 A2 | 2/2014 |
| EP | 2693553 A2 | 2/2014 |
| EP | 2696429 | 2/2014 |
| EP | 2757624 A1 | 7/2014 |
| JP | H8-83595 | 3/1996 |
| JP | 11-086877 A | 3/1999 |
| JP | H11-73941 A | 3/1999 |
| JP | H11-204130 A | 7/1999 |
| JP | 2000-156241 | 6/2000 |
| JP | 2002-246278 A | 8/2002 |
| JP | 2003-529944 A | 10/2003 |
| JP | 2006-4792 A | 1/2006 |
| JP | 2006-313737 A | 11/2006 |
| JP | 2009-533833 A | 9/2009 |
| JP | 2011-198562 A | 10/2011 |
| JP | 2014-002836 A | 1/2014 |
| JP | 2014-036020 A | 2/2014 |
| JP | 2014-519166 A | 8/2014 |
| JP | 2015-002086 A | 1/2015 |
| JP | 2015-8092 A | 1/2015 |
| JP | 2015-141789 A | 8/2015 |
| JP | 2016-042433 A | 3/2016 |
| JP | 2016-519401 A | 6/2016 |
| KR | 10-0250163 B1 | 12/1999 |
| KR | 10-2006-0103028 | 9/2006 |
| KR | 10-2007-0065301 A | 6/2007 |
| KR | 10-2008-0036250 A | 4/2008 |
| KR | 10-2009-0110469 A | 10/2009 |
| KR | 10-2010-0137290 A | 12/2010 |
| WO | 02/45190 A1 | 6/2002 |
| WO | 2007/097172 A1 | 8/2007 |
| WO | 2012/133233 A1 | 10/2012 |
| WO | 2013/038946 A1 | 3/2013 |
| WO | 2016/050329 A1 | 4/2016 |

OTHER PUBLICATIONS

Notification of Reason for Refusal dated Jan. 6, 2021, directed to KR Application No. 10-2019-7028478; 13 pages.
International Search Report and Written Opinion dated Jun. 1, 2018, directed to International Application No. PCT/GB2018/050691; 14 pages.
Search Report dated Sep. 21, 2017, directed to GB Application No. 1704295.3; 1 page.
International Search Report and Written Opinion received for PCT Patent Application No. PCT/GB2018/050692, dated May 29, 2018, 9 pages.
International Search Report and Written Opinion received for PCT Patent Application No. PCT/GB2018/050693, dated May 30, 2018, 10 pages.
International Search Report and Written Opinion received for PCT Patent Application No. PCT/GB2018/050694, dated May 30, 2018, 9 pages.
Notice of Reasons for Rejection dated Jul. 27, 2020, directed to JP Application No. 2019-550576; 9 pages.
Notice of Reasons for Rejection dated Apr. 19, 2021, directed to JP Application No. 2019-550741; 9 pages.
Notice of Reasons for Rejection dated Aug. 3, 2020, directed to JP Application No. 2019-550741; 13 pages.
Notice of Reasons for Rejection dated Sep. 7, 2020, directed to JP Application No. 2019-550842; 8 pages.
Notification of Reason for Refusal dated Jan. 6, 2021, directed to KR Application No. 10-2019-7028479; 10 pages.
Notification of Reason for Refusal dated Jan. 6, 2021, directed to KR Application No. 10-2019-7028480; 10 pages.
Notification of Reason for Refusal dated Jan. 6, 2021, directed to KR Application No. 10-2019-7028481; 12 pages.
Office Action received for Japanese Patent Application No. 2019-550842, dated Jun. 7, 2021, 6 pages (3 pages of English Translation and 3 pages of Original Document).
Office Action received for Korean Patent Application No. 10-2019-7028478, dated Jul. 8, 2021, 10 pages (5 pages of English Translation and 5 pages of Original Document).
Office Action received for Korean Patent Application No. 10-2019-7028479, dated Jul. 8, 2021, 9 pages (5 pages of English Translation and 4 pages of Original Document).
Office Action received for Korean Patent Application No. 10-2019-7028480, dated Jul. 8, 2021, 8 pages (4 pages of English Translation and 4 pages of Original Document).
Office Action received for Korean Patent Application No. 10-2019-7028481, dated Jul. 8, 2021, 10 pages (5 pages of English Translation and 5 pages of Original Document).
Search Report dated Sep. 21, 2017, directed to GB Application No. 1704292.0; 1 page.
Search Report dated Sep. 21, 2017, directed to GB Application No. 1704293.8; 1 page.
Search Report dated Sep. 21, 2017, directed to GB Application No. 1704294.6; 1 page.

* cited by examiner

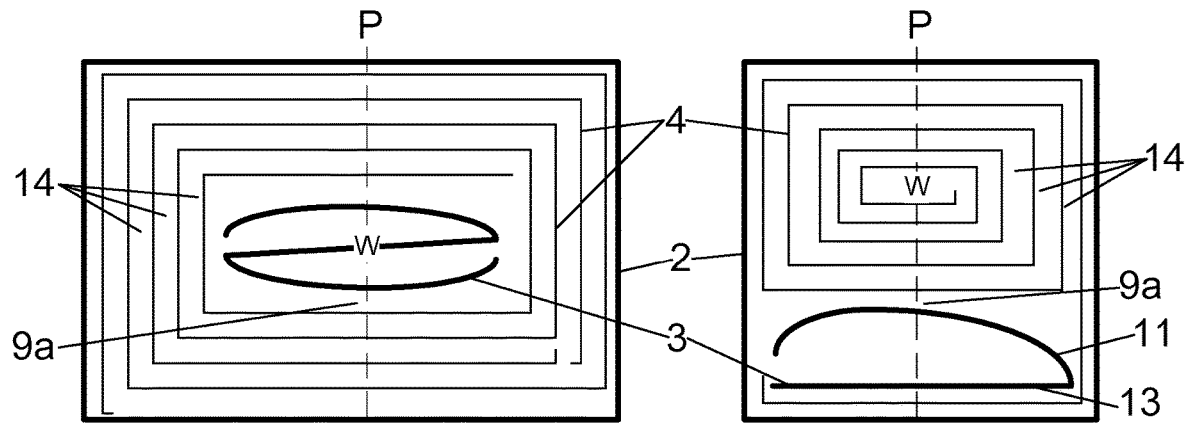
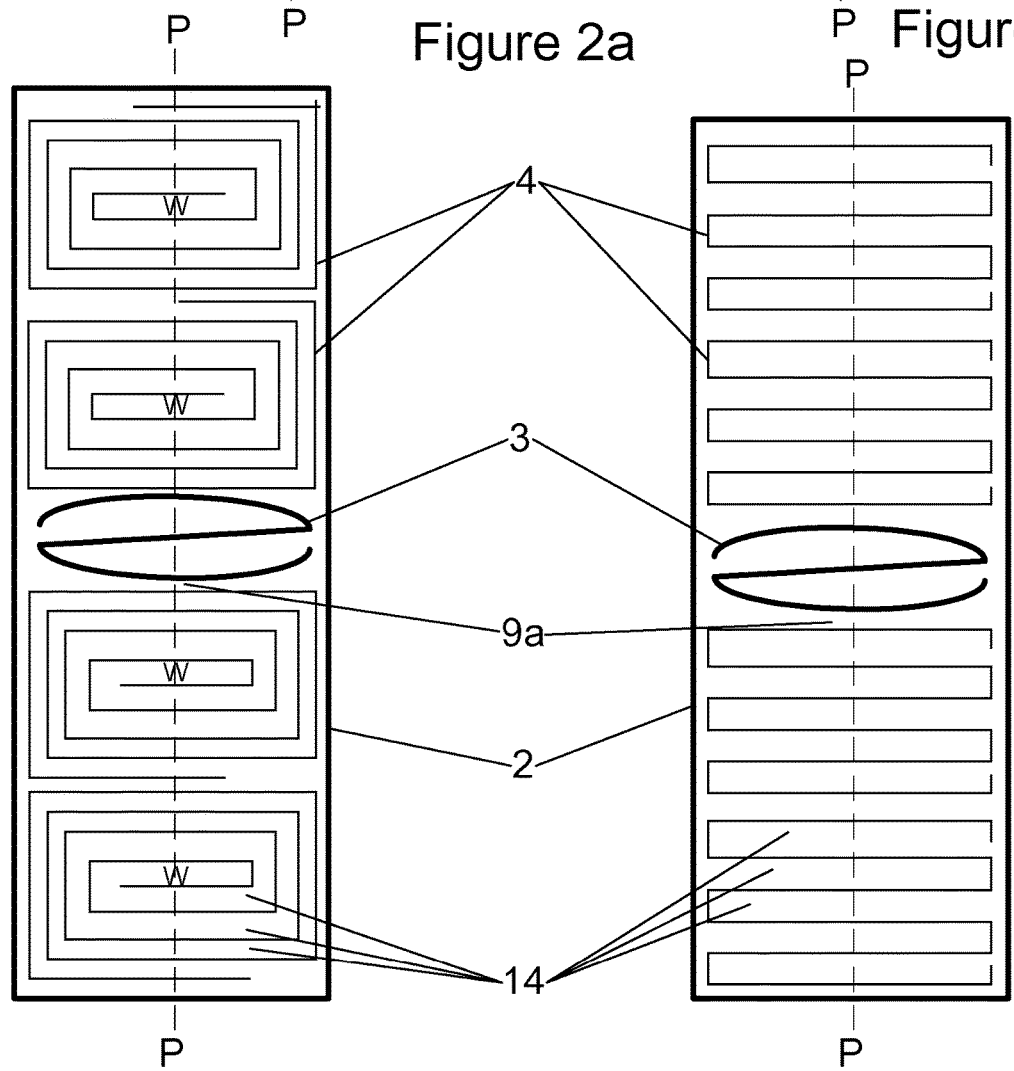
Figure 2a    Figure 2b
Figure 2c    Figure 2d

ENERGY STORAGE DEVICE

REFERENCE TO RELATED APPLICATIONS

This application is a national stage application under 35 USC 371 of International Application No. PCT/GB2018/050691, filed Mar. 16, 2018, which claims the priority of United Kingdom Application No. 1704295.3, filed Mar. 17, 2017, the entire contents of each of which are incorporated herein by reference.

FIELD OF THE INVENTION

This invention relates to a container for an energy storage device. More specifically, the present invention relates to a container for electrochemical cells.

BACKGROUND OF THE INVENTION

Electrochemical cells comprise reactive and hazardous materials that require careful packing to ensure product safety. The packing should contain the hazardous material and also accommodate for changes in temperature and volume of the material as the cells charge and discharge. As well as having a desired robustness, the packaging is also required to have a low weight and volumetric efficiency, so as not to diminish the overall energy density of the energy storage device. The packing and design of the packaging should also avoid adding any unnecessary resistance to energy storage device.

Conventional design and packaging for energy storage devices may not be able to safely and efficiently accommodate cells with increased energy density. Progress in energy storage technology has produced electrochemical cells with an increased energy density. This can lead to higher operating temperatures and large volume changes of active materials during a charge/discharge cycle compared to conventional electrochemical cells. With conventional wound cells, the number of electronic contacts to the electrode is limited to the number of tabs applied to the current collector foil. Increasing the number of tabs on the current collector results in a reduced surface area for active electrode coating and therefore reduces cell capacity and energy density. The limited number of contact tabs, coupled with the increased length of electrodes used for winding, increases the current path length and increases overall cell resistance.

Conventional prismatic or hard-case cell containers provide a more robust packaging for electrochemical cells. The electrodes and separator are wound under tension, providing pressure and good contact between the electrode layers and the separator. The rigid nature of the hard-case container does not allow for large volumetric expansion and contraction of electrodes during cycling.

Conventional soft-pack prismatic pouch packaging has been used to house a multi-electrode arrangement. In the soft-pack design, vacuum sealing ensures that the components of the cells are kept together by external pressure to provide the desired physical contact between the electrodes and the separator. In addition, the nature of the soft-pack material accommodates expansion of the electrodes during a charge/discharge cycle. However, the soft-design can be seen as being inherently unsafe as it can be easily damaged and rupture, and therefore unsuitable for high energy density cells.

SUMMARY OF THE INVENTION

According to some embodiments of the present invention, there is provided an energy storage device comprising: a container, a mandrel, at least one sheet of separator material, and two or more discrete electrodes; the container comprising an inner surface; and the mandrel comprising a mandrel surface, and is positioned within the container so that the mandrel surface is spaced apart from the inner surface to define a cell cavity within the container; wherein the container has a packing axis that passes through the cavity, the mandrel surface, and the inner surface, and wherein the mandrel is compressible in the direction of the packing axis, the at least one sheet of separator material is arranged in the cavity to provide a plurality of separator layers along the packing axis, and an electrode is provided to occupy the space between each of the separator layers.

The combination of discrete electrode sheets and a compressible mandrel of some embodiments allows for a cell comprising a stack of efficiently connected high energy density electrodes stored within a resilient protective container, in contrast to typical wound cells that rely on a continuous sheet of anode/cathode electrode material wound within the separator material. As such the device may comprise two or more discrete positive electrodes and two or more discrete negative electrodes.

The plurality of the separator layers and the discrete electrodes which occupy the separator layers are aligned along a packing axis so that the cells expand and contracts in the same general direction as the packing axis. The compressible mandrel can be used as a winding aid, but more importantly adapts to the volume change of the electrodes within the separator layers to ensure that there is enough compression and a steady physical contact between the electrodes, whilst absorbing any expansion in the material during a charge/discharge cycle. In other words, embodiments of the present invention do not rely on a component of the electrochemical cell to be wound around the mandrel, the mandrel main function is to support the separator material against the inner surfaces of the container by contracting or expanding according to the electrode volume during a charge or discharge.

The use of a compressible mandrel may give rise to dead space within the energy storage device container and so can be seen to be less efficient than conventional vacuum sealing of soft-pack cell designs. However, the improved safety of a hard-case design is important for high energy density storage devices. Embodiments of the present invention thus offer an improvement in packing safety whilst providing slightly lower packing efficiency. In addition, a good level of contact is achieved from the biasing of the mandrel, which is compressible to absorb any expansion of the electrode material. Preferably the mandrel is made of a single material to reduce the cost of manufacture and is shaped so as to be resiliently biased in the direction of the packing axis of the container.

The compressible mandrel allows for a system having more than two high energy density electrodes. The volumetric change of a number of sheets of active materials can be absorbed by the compressible mandrel. There is also another advantage that a lower overall resistance can be achieved by having connection tabs for each electrode in the device. The resulting cell has electrodes with shorter current path lengths through the current collectors. In contrast, conventional wound cells have two continuous sheets of active material, which is easier and less expensive to manufacture than embodiments of the present invention. In addition, the current path lengths through the active material for conventional devices are much longer and thus have a higher resistance, thereby reducing the efficiency of the device.

Thus, embodiments of the present invention allow for a device with multiple electrochemical cells that are stored robustly without unduly impairing the volumetric packing or working efficiency of the device.

The face of the mandrel may be curved. The curved face of the mandrel can provide a uniform stack pressure over the surface of the electrodes within the packaging. In addition, the mandrel can respond and adapt its shape effectively to relieve any build-up of pressure during expansion of active material within the device.

The mandrel may have a single surface and be circular or arced in shape, or alternatively the mandrel may be shaped to have a second surface. For instance, the second surface of the mandrel may be curved such that the outline of the cross-sectional shape of the mandrel is elliptical. In some embodiments, the second mandrel surface may be flat and rest against another inner wall or surface of the container. Alternatively, the second mandrel surface may contact the separator material to provide a compression force. The separator material contacting the second mandrel surface may be the same or different separator material that contacts the first mandrel surface. It is particularly advantageous when the arrangement of discrete electrodes along the packing axis align with the surface(s) of the mandrel. The surface of the mandrel can be greater or of the same length as the discrete electrode parts. This enables the compressive forces from expanding electrodes to be absorbed across the surface of the mandrel.

The inner surface of the container may be curved, such that the container is generally cylindrical in shape. The mandrel may be positioned such that its longitudinal axis aligns with the longitudinal axis of the container. In some embodiments, the cavity is generally tubular or pipe shaped, and the separator material sheet(s) are wound around the mandrel to fill the cavity. The device in some embodiments is relatively easy to construct. However, due to the spiral of the separator material sheet(s) and the difference in size of each separator layer, the size of the electrodes increases along the packing axis away from the mandrel.

In some embodiments, the container may be shaped such that it comprises a second inner surface opposite the inner surface. For example, the container might be cube or cuboid in shape with opposed inner surfaces being curved. In some embodiments, the packing axis passes through the container from the inner surface to the second inner surface, and the mandrel is positioned along the packing axis to provide a second cavity. The mandrel may extend across the full width, or enough of the width of the container to divide the inner space into two cavities. At least one sheet of separator material may be arranged in the second cavity to provide a second plurality of separator layers along the packing axis, and the one or more electrodes are provided between the second separator layers. Furthermore, in some embodiments, the arrangement of the sheet(s) of separator material about the mandrel can take several forms. For example, a sheet of separator material can be wound about the mandrel, or a sheet of separator material could be folded in the cavity. In either instance a number of separator layers are created which can be occupied by a discrete electrode. When there is more than one cavity, at least one sheet of separator material may be provided in each cavity. Furthermore, a plurality of discrete sheets of separator material may be provided in each cavity. Having more than one sheet of separator material allows for different packing arrangements within the cavity/cavities and also means that damage of electrodes or separator material in one part of the device can be isolated.

The inner surface and/or the second inner surface of the container may be concave. By curving the surfaces which face the mandrel surfaces, a more uniform pressure can be applied to the cells within the cavities. This provides uniform pressure between the electrodes and the separator material across their width, thereby improving the efficiency of the cell.

The mandrel may be positioned centrally along the packing axis so that the separator layers and second separator layers (and as such the occupying electrodes) are arranged symmetrically about the mandrel.

BRIEF DESCRIPTION OF THE DRAWINGS

In order to better understand the present invention, and to show more clearly how embodiments of the invention may be put into effect, embodiments will now be described, by way of example, with reference to the following drawings:

FIGS. 2a-2d are schematics of alternative layouts of separator material and mandrel within the energy storage device, according to some embodiments;

DETAILED DESCRIPTION OF THE INVENTION

Figure 1:
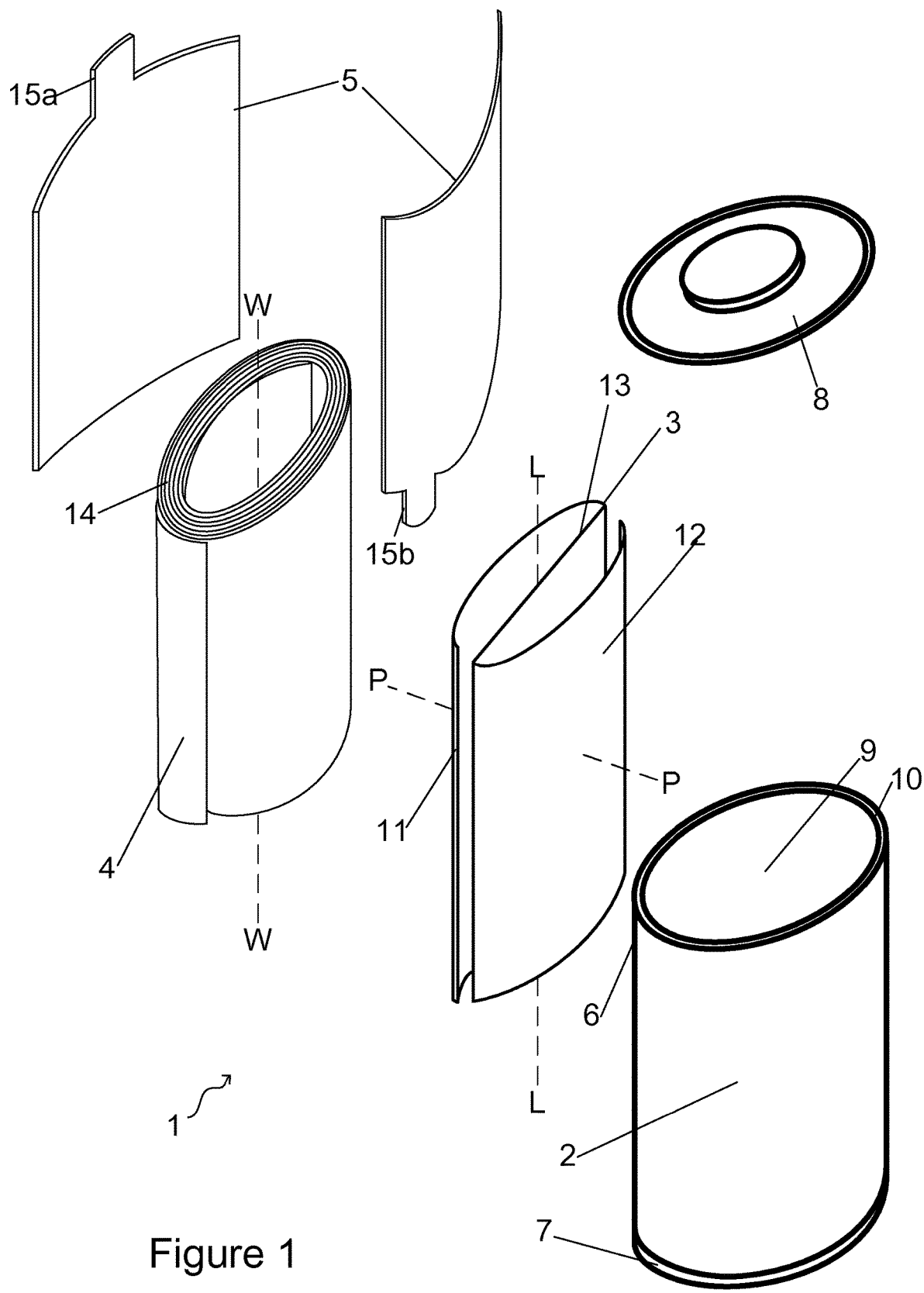
FIG. 1 is an exploded view of a schematic of an energy storage device of the present invention, according to some embodiments.

FIG. 1 shows an energy storage device 1 comprising a container 2, a compressible mandrel 3, separator material 4, and discrete electrodes 5. The container 2 has a casing 6, a base 7 and a cap 8 that together form the shell of the energy storage device 1. The casing 6 is formed of robust material to avoid external objects from piercing or rupturing the device 1. The casing 6 could be deep drawn/rolled/shaped and formed with the base 7 and cap 8 so as to form an internal space 9 for holding the electrochemical cell components, namely the compressible mandrel 3, separator material 4, and electrodes 5. The casing 6 has an inner surface 10 facing into the space 9. The base 7 and cap 8 are provided over the open ends of the casing 6 to enclose the electrochemical cell components 3, 4, 5 within the container 2. Although the base 7 and cap 8 are shown as separate parts from the casing 6, it is conceivable that the casing 6 may include, or be attached to, a preformed base 7 and cap 8.

The mandrel 3 has a first mandrel surface 11 and second mandrel surface 12 connected by an arm 13. The mandrel 3 is formed from a single piece of pliable material, such as a plastic or metal. The cross section of the mandrel 3 generally has the shape of an S and its outline is elliptical. The mandrel 3 has a longitudinal axis L which is normal to the S shape formed by the curved surfaces 11, 12 and the arm 13. The mandrel 3 extends along its longitudinal axis L such that it is similar in length to the container 2. The general cross-sectional shape of the mandrel 3 is the same along the entire length of its longitudinal axis L.

The mandrel 3 is formed so that it can be placed in the internal space 9 of the container 2. When the mandrel 3 is positioned within the internal space 9, a cavity 9a remains between the mandrel surfaces 11, 12 and the inner surface 10 of the container 2. Due to the shape of the mandrel 3, columns of hollow dead space exist between the mandrel surfaces 11, 12 and the arm 13 which extend along the longitudinal axis L. The hollow columns allow space for the mandrel 3 to collapse, as well as providing access for welding to at least part of the base 7 when the electrochemical cell components 3, 4, 5 are placed within the container 2.

The mandrel 3 is compressible in the direction of a packing axis P, which will be described in more detail in relation to the separator material 4. Generally speaking, the mandrel 3 can compress and/or deform such that the general elliptical shaped outline of its cross section decreases in size. The volume of the space 9 taken up by the mandrel 3 decreases as the mandrel 3 compresses. Furthermore, the mandrel surfaces 11, 12 can deform under extreme pressure such that the curvature or arc can change according to compression forces applied to the surface.

The separator material 4 as presented in FIG. 1 is a continuous sheet of electronically insulating porous material. The separator material 4 is rolled and positioned within the cavity 9a between the container 2 and the mandrel 3. The separator material 4 is wound around the mandrel 3 about a winding axis W which overlies the longitudinal axis L of the mandrel 3 when the electrochemical cell container 1 is in its complete form. As the sheet of separator material 4 is wound about winding axis W, layers of separator material are formed as the sheet rolls over itself. In the complete energy storage device 1, the separator material 4 is arranged in the container 2 to provide a plurality of separator layers placed along the packing axis P. This creates spaces 14 between layers of the separator material 4 which are occupied by the electrodes.

Electrodes 5 are positioned along the packing axis P within the spaces 14 of the wound separator material 4. For simplicity, only two electrodes 5 (one anode and one cathode along with the separator material 4 forming a cell) are shown in FIG. 1. However, an electrochemical cell container 1 of some embodiments may contain many electrodes 5, forming multiple electrochemical cells.

The electrodes 5 each comprise a tab 15a, 15b which can be secured to the internal surfaces of the base 7 and cap 8. By providing a tabs 15a, 15b on each electrode 5, the current path length for each electrode 5 is reduced and the internal resistance of the cell decreases.

As the cells charge/discharge, the electrodes 5 may expand and contract. As the electrodes 5 expand and occupy more volume within the internal space 9, the mandrel 3 compresses. Similarly, as the electrodes contract, the mandrel 3 expands to re-occupy the volume whilst also providing a constant compressive force along the packing axis P between the separator material 4 and the electrodes 5. The curved mandrel surfaces 11, 12 ensure that a uniform pressure over the surface of the electrodes 5 is maintained.

Various alternative electrochemical cell container 1 arrangements that are within the scope of the present invention are shown schematically in FIGS. 2a-2d. The electrochemical cell containers 1 are shown in cross section along the longitudinal axis L of the mandrel 3, and without electrodes 5 for simplicity. Each electrochemical cell container 1 is shown in an over simplified manner as a squared container 2. However, it is appreciated that the separator material 4 would curve to occupy the internal space 9 of the container 2.

In FIG. 2a, two sheets of separator material 4 are wound about the mandrel 3. The mandrel 3 is positioned along the winding axis W of the separator materials 4. The sheets of the separator material 4 are concentric about the longitudinal axis L of the mandrel 3. A multitude of layers 14 is provided between the layers of the wound separator material 4 for housing electrodes 5. The electrodes 5 are arranged along the packing axis P.

In FIG. 2b, a mandrel 3 is provided with a single curved surface 11. The mandrel arm 13 rests against an internal surface 10 of the container 2. One sheet of separator material 4 is provided in the internal space 9 and is wound around a winding axis W. The winding axis W does not overlie the longitudinal axis L of the mandrel 3. Discrete layers 14 are provided in the roll of separator material 4 for housing electrodes. The electrodes 5 are arranged along the packing axis P.

FIGS. 2c and 2d illustrate further embodiments of the present invention, where rolls or folds of separator material sheets 4 are positioned in the cavities 9a about the mandrel 3, the separator 4 is not wound about the mandrel 3. The device in FIG. 2c comprises two rolled sheets of separator material 4 in each cavity 9a. In FIG. 2d, the sheets of separator material 4 are folded in the cavity 9a. Electrodes 5 would be placed within the spiral layers or the folds of the separator material 4. In some embodiments, the mandrel 3 is merely functioning to absorb expansion of the electrode 5 within the device 1, and not providing a bobbin for material 4, 5 to be wound around.

Figure 3A:
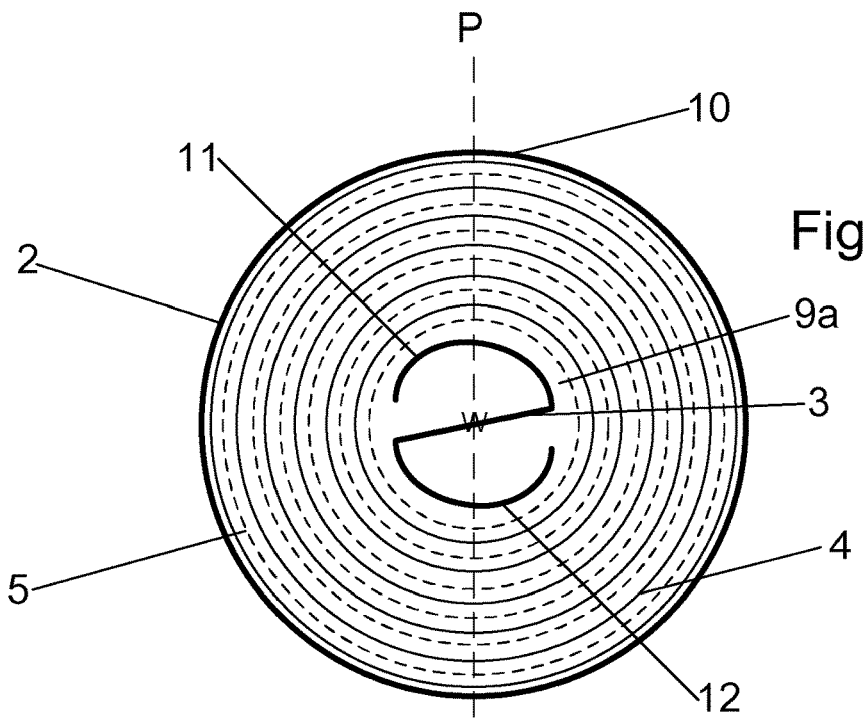
FIGS. 3a-3c are schematics of some embodiments of energy storage devices of the present invention.
Figure 3B:
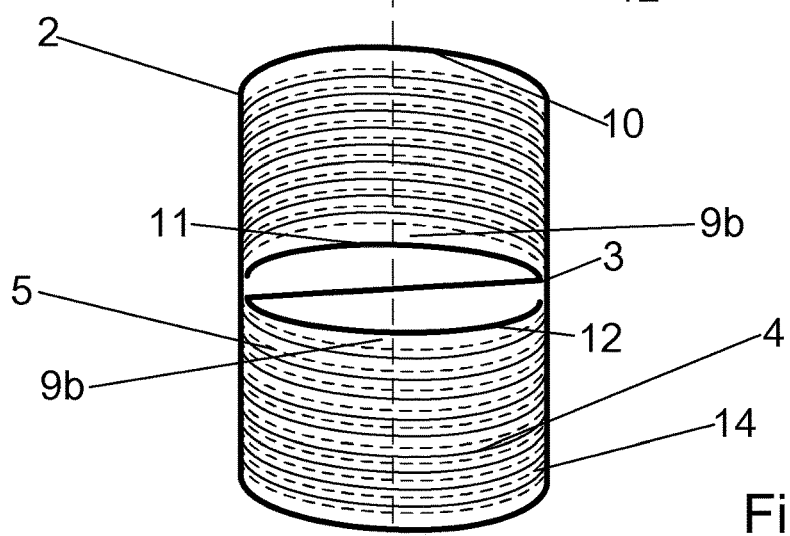
Figure 3C:
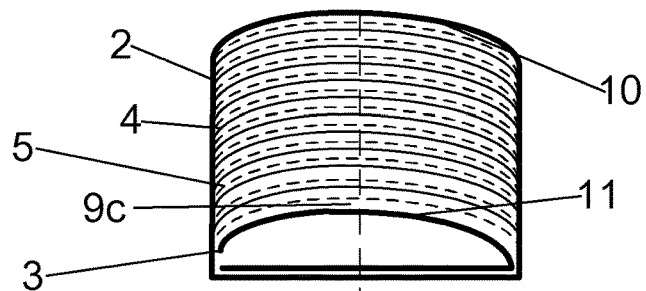

The container 2 in FIG. 1 is shown as cylindrical but could also form the shape of any prismatic cell. Cross-sectional schematics are shown in FIGS. 3a-3c of device 1. The layers of separator material 4 are shown as concentric rings instead of a continuous rolled sheet in the cavity 9a merely as a way of simplifying the drawing. Electrodes 5 are shown schematically as broken lines and can be positioned anywhere within the layers 14 between the rolled sheets of separator material 4. FIG. 3a shows a simplified cross sectional view of the complete device 1 of FIG. 1. The inner surface 10 is one continuous surface, and the mandrel surfaces 11, 12 face different regions of the same inner surface 10.

FIG. 3b illustrates a device 1 that has a generally cuboid shaped container 2, wherein the inner surfaces 10 facing the mandrel faces 11, 12 are concave. The separator material 4 is folded or wound so that fills the cavities 9b between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

FIG. 3c illustrates a device 1 that has a generally cuboid shaped container 2, wherein the device 1 has only one cavity 9c which is filled with electrochemical cells. The inner surface 10 facing the mandrel face 11 is concave. The separator material 4 is folded or wound so that fills the cavity 9c between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

In the examples shown in FIGS. 3a-3c, the curvature of the external casing matches the concave shape of the inner surfaces 10, the external casing may be flatted to provide an external cuboid shape. However, it may be beneficial to keep the curvature of the casing 6.

Figure 4A:
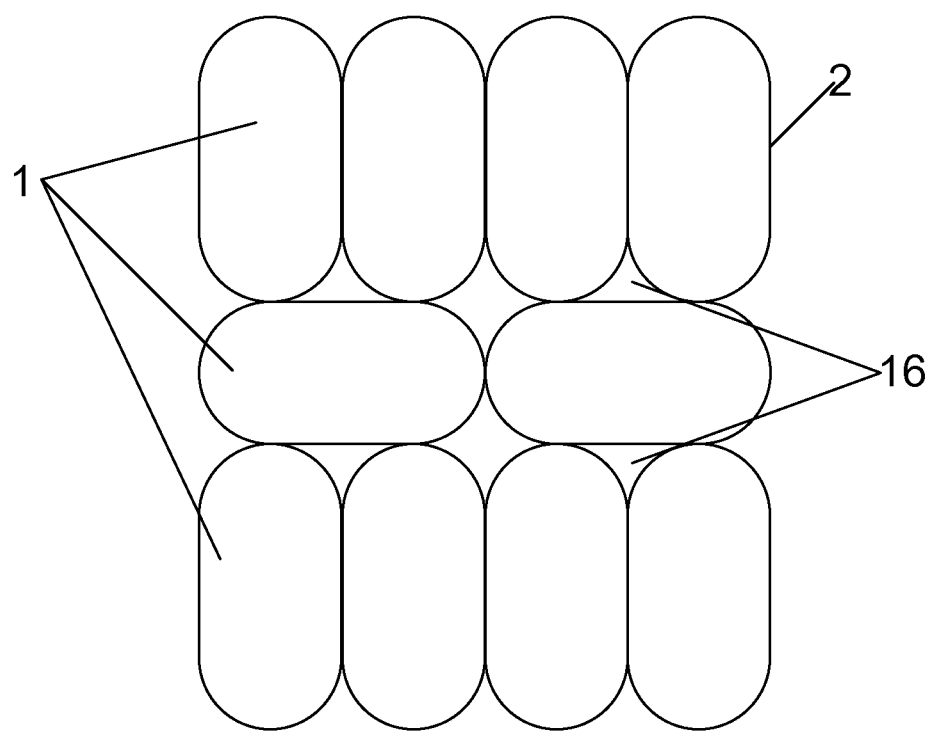
FIGS. 4a and 4b are schematics of arrays of alternative container shapes, according to some embodiments.
Figure 4B:
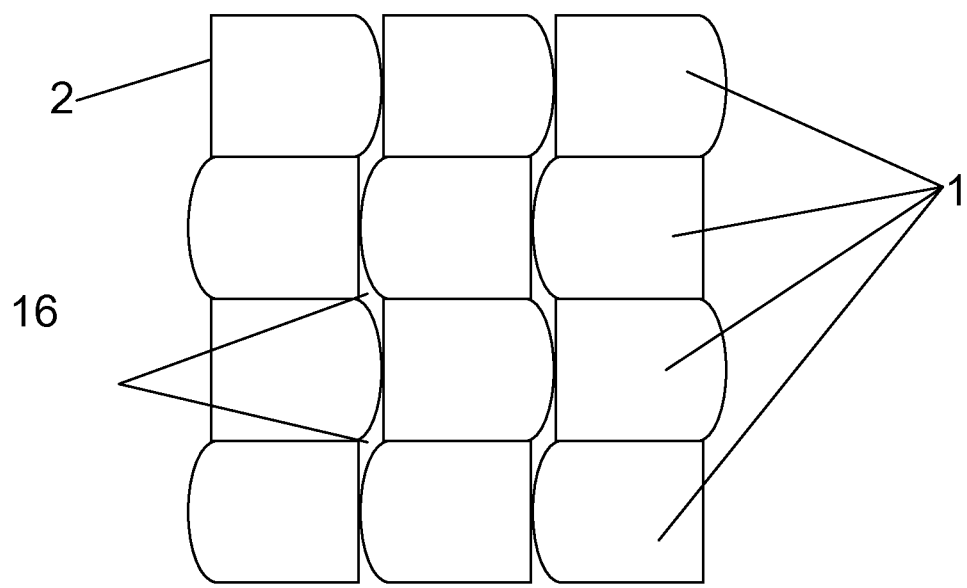

FIGS. 4a and 4b show an array of energy storage devices 1 according to FIGS. 3b and 3c respectively. The curvature of the casing 6 allows for gaps 16 between the containers 2 when arranged in an array. The curved casing 6 ensures that physical contact between adjacent containers 2 is reduced. A fluid such as air can be provided in the gaps 16 between the containers 2. The reduced contact between the containers 2 ensures that low heat transfer occurs between adjacent devices 1. In addition, fluid is free to flow over the array of containers and act as a coolant to remove any excess heat given off by the cells within the devices 1.

The invention claimed is:

1. An energy storage device comprising:
a container comprising a first inner surface and a second inner surface disposed opposite the first inner surface;
a mandrel comprising a first mandrel surface and a second mandrel surface, the mandrel positioned within the container such that the first mandrel surface is spaced apart from the first inner surface to define a first cell cavity within the container and the second mandrel surface is spaced apart from the second inner surface to define a second cell cavity within the container;
at least one sheet of separator material;
a first plurality of discrete electrodes; and
a second plurality of discrete electrodes;
wherein:
the container has a packing axis that passes through the first cell cavity, the mandrel, and the second cell cavity,
the mandrel is compressible in the direction of the packing axis,
a first sheet of separator material of the at least one sheet of separator material is arranged in the first cell cavity wholly to provide a first plurality of separator layers along the packing axis,
a second sheet of separator material of the at least one sheet of separator material is arranged in the second cell cavity wholly to provide a second plurality of separator layers along the packing axis,
the first plurality of discrete electrodes comprises a first plurality of discrete positive electrodes and a first plurality of discrete negative electrodes,
the second plurality of discrete electrodes comprises a second plurality of discrete positive electrodes and a second plurality of discrete negative electrodes,
the first plurality of discrete electrodes is distributedly disposed along the packing axis and wholly within the first cavity,
the second plurality of discrete electrodes is distributedly disposed along the packing axis and wholly within the second cavity,
the first plurality of discrete electrodes occupies space between adjacent separator layers of the first plurality of separator layers, and
the second plurality of discrete electrodes occupies space between adjacent separator layers of the second plurality of separator layers.

2. The device of claim 1, wherein at least one of the first inner surface or the second inner surface is concave.

3. The device of claim 1, wherein the mandrel is positioned centrally along the packing axis so that the first plurality of separator layers and the second plurality of separator layers are arranged symmetrically about the mandrel.

4. The device of claim 1, wherein the mandrel is positioned centrally along the packing axis so that the first sheet of separator material in the first cell cavity and the second sheet of separator material in the second cell cavity are arranged symmetrically about the mandrel.

5. The device of claim 4, wherein the at least one sheet separator material includes a first plurality of sheets of separator material arranged in the first cell cavity wholly and a second plurality of sheets of separator material arranged in the second cell cavity wholly.

* * * * *